Patented Oct. 14, 1952

2,614,131

UNITED STATES PATENT OFFICE 2,614,131

FLUOROCARBON MONO-IODIDES AND METHOD OF MAKING

Joseph H. Simons and Thomas J. Brice, State College, Pa., assignors to Minnesota Mining & Manufacturing Company, St. Paul, Minn., a corporation of Delaware No Drawing. Application August 22, 1949, Serial No. 111,761

1 Claim. (Cl. 260—653)

This application relates to our discovery of a novel class of chemical compounds, the saturated polycarbon fluorocarbon mono-iodides, and to a method of making them.

These new compounds contain only carbon, fluorine and iodine, and they are saturated compounds (i. e., the carbon atoms in the molecule are linked only by single valence bonds). They contain two or more carbon atoms and a single iodine atom in the molecule, the remainder being fluorine atoms. This class embraces both the non-cyclic (open-chain) compounds, having the formula:

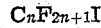
$C_nF_{2n+1}I$ and the cyclic compounds, having the formula:

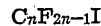
$C_nF_{2n-1}I$ where $n$ is an integer having a value of at least two. The cyclic compounds are of two types, those in which the iodine atom is bonded to a non-cyclic carbon atom of a side chain, and those in which the iodine atom is bonded to a cyclic carbon atom of a ring.

These compounds may be regarded as the mono-iodide derivatives of the saturated polycarbon fluorocarbons (consisting solely of carbon and fluorine), wherein a single fluorine atom has been replaced by an iodine atom. The saturated fluorocarbons are characterized by a high degree of chemical inertness. In contrast, the present compounds are relatively reactive in that the iodine atom offers a point of ready attack for chemical reactions. The present compounds therefore have value as chemical intermediates for the making of polycarbon fluorocarbon derivatives, and for introducing polycarbon fluorocarbon radicals into a variety of organic compounds. The reactivity of the present compounds is much greater than that of the corresponding fluorocarbon chlorides and bromides.

The present compounds yield simple metal-containing fluorocarbon derivatives when reacted with active metals, and these have great value as intermediates in synthesis. In contrast, compounds containing more than one iodine atom tend to be unstable and reaction with active metals results generally in olefin formation or in complicated products.

The uniqueness of the present compounds is further indicated by the fact that they cannot be effectively made by various prior methods that have been employed for making the corresponding saturated polycarbon fluorocarbon mono-chlorides and mono-bromides. For example, the mono-chlorides and mono-bromides can be made in good yields by thermal chlorination and bromination, respectively, of the corresponding saturated fluorocarbon mono-hydrides (see paper by Simons, Brice and Pearlson, Journal of the American Chemical Society, vol. 68, pp. 968–969, June 1946), but this procedure is ineffective for making the mono-iodides.

We have discovered that the present compounds can be made in satisfactory yields by the reaction, at moderately elevated temperatures, of iodine pentafluoride ($IF_5$), and the fluorocarbon mono-olefin which has a carbon skeletal structure corresponding to that of the desired fluorocarbon mono-iodide product compound. A mixture of iodine polyfluorides can be used, and the iodine pentafluoride may be substituted by another iodine polyfluoride (e. g., iodine heptafluoride) as an equivalent, but $IF_5$ is the preferred compound from the standpoints of ease of preparation and of yield of desired end compounds.

The term "fluorocarbon mono-olefin" defines and designates compounds consisting solely of carbon and fluorine having only one carbon to carbon double bond, all other carbon to carbon bonds being single. This double bond provides the point of attack for the reaction. The reaction results in attaching an iodine atom to one of the carbon atoms between which the double bond is located, and a fluorine atom to the other carbon atom, with the result that the carbon to carbon double bond becomes saturated, being converted to a single bond.

Thus, for example, $C_2F_4$ and $IF_5$ can be reacted to produce $C_2F_5I$, and, in general, $C_nF_{2n}$ can be reacted to produce $C_nF_{2n+1}I$ (where $n$ is an integer having a value of at least two). The cyclic fluorocarbon mono-olefins can also be used as starting compounds. These have the formula $C_nF_{2n}$ and can be reacted with $IF_5$ to produce saturated cyclic fluorocarbon mono-iodides having the formula $C_nF_{2n+1}I$. The cyclic compounds of the type wherein the iodine atom is bonded to a cyclic carbon atom can be formed from fluorocarbon mono-olefins which have a carbon to carbon double bond in a carbocyclic ring. Use can be made of fluorocarbon mono-olefins which have a double bond between a carbon atom of a ring and a carbon atom of a side chain. In this case an iodine atom may be attached either to the cyclic or to the non-cyclic carbon atom between which the double bond is located, and a mixture of isomers may be formed consisting of both species of fluorocarbon mono-iodide reaction products. In the case of cyclic fluorocarbon mono-olefins which have a double bond located between two carbon atoms of a side chain, the resultant cyclic fluorocarbon mono-iodides will have an iodine atom bonded to a non-cyclic carbon atom of a side chain.

A feature of the present procedure is its simplicity. Thus it has been found that a vapor-phase mixture of the starting compounds can be passed through a copper tube heated to a temperature of the order of 175–250° C. and will react to provide a useful yield of the desired product, which can be readily separated from the reaction mixture. The reaction substantially increases the boiling point of the fluorocarbon product compound above that of the fluorocarbon starting compound. Thus the boiling point of $C_2F_4$ is about minus 80° C., while that of $C_2F_5I$ is about plus 8° C. (at 725 mm.).

Another vapor-phase reaction procedure is to introduce the fluorocarbon mono-olefin feed stock as a liquid into a hot stream of gaseous iodine polyfluoride which may be mixed with an inert diluent gas, such as nitrogen, the liquid feed vaporizing to form a vapor phase reaction mixture with the iodine polyfluoride, which is reacted at an appropriate temperature to form the desired product.

Pressures higher than atmospheric can be employed.

The reaction is not restricted to vapor phase procedures. A liquid mixture of the reactants, which may include an inert diluent, can be reacted at the appropriate temperature, under a pressure sufficient to maintain the reactants in liquid phase.

The following table illustrates a variety of fluorocarbon mono-olefin starting compounds, the corresponding saturated fluorocarbon mono-iodide reaction products, and the approximate boiling points of the latter (at atmospheric pressure):

| Starting Compounds | Reaction Products | B. P. (° C.) |
|---|---|---|
| $C_2F_4$ | $C_2F_5I$ | 8 |
| $C_3F_6$ | $C_3F_7I$ | 39 |
| $C_4F_8$ | $C_4F_9I$ | 67 |
| $c-C_6F_{11}CFCF_2$ | $c-C_6F_{11}C_2F_4I$ | 152 |
| $c-C_4F_6$ | $c-C_4F_7I$ | 63 |
| $c-C_6F_{10}$ | $c-C_6F_{11}I$ | 112 |
| $c-C_6F_9CF_3$ | $c-C_6F_{10}ICF_3$ | 137 |

The first three product compounds are non-cyclic; the fourth is a cyclic compound wherein the iodine atom is bonded to a non-cyclic carbon atom; and the last three are cyclic compounds wherein the iodine atom is bonded to a cyclic carbon atom.

The preparation of iodine pentafluoride ($IF_5$) is described in a review article by Booth and Pinkston, Chem. Rev., vol 41, page 421 (1947). The fluorocarbon mono-olefins can be prepared by dehalogenation of the corresponding fluorocarbon dihalides, according to well-known techniques.

The following example of the process illustrates the production of $C_2F_5I$ and it can also be employed for making other products from the corresponding fluorocarbon olefin starting compounds.

Example 6

The mixing vessel consisted of a vertical copper tube having a diameter of 2 in. and a length of 5 in., provided with a welded copper bottom plate and a silver-soldered copper top plate. This was provided with a fluorocarbon inlet tube consisting of a ¼ in. diameter copper tube silver-soldered into the top plate and extending to within ½ in. of the bottom of the vessel. This vessel was also provided with a condenser return tube consisting of a vertical copper tube of ½ in. diameter silver-soldered into the top plate and extending to within ½ in. of the bottom of the vessel. This latter tube extended upwardly from the top plate about 9 inches an was silver-soldered to a vertical water-cooled copper condenser, which in turn was connected to a purification train consisting of a $P_2O_5$ tube, a bubbler containing alkaline thiosulfate-KI solution, a $P_2O_5$ tube, and finally a collecting trap cooled by liquid air.

The rector tube consisted of a ⅜ in. diameter copper tube, the lower end of which was silver-soldered into the aforesaid top plate of the mixing vessel so as to be flush therewith. This tube was bent into a 14 in. bow and the upper end was silver-soldered into the vertical condenser return tube at a point just below the condenser. This reactor tube was wrapped with an insulated nichrome electric heating coil so as to permit of securing the desired heating of the reaction mixture passing therethrough.

Use was made of liquid $IF_5$, which was present in the mixing vessel in sufficient amount to seal off the lower extremities of the inlet and condenser return tubes. The fluorocarbon olefin gas was introduced through the inlet tube, bubbled through the $IF_5$, and the vapor mixture was forced out through the reactor tube to the condenser. High-boiling materials, including unreacted $IF_5$, were condensed therein and dropped back into the mixing vessel through the vertical return tube. The uncondensed vapor mixture then passed from the condenser to and through the aforesaid purification train to the liquid-air cooled collecting trap. For extended continuous operation, the apparatus can be easily modified by providing an inlet tube for replenishing the $IF_5$ during operation.

The $IF_5$ can be conveniently formed in situ in the mixing vessel by dropping solid iodine through the condenser into the vessel and introducing fluorine gas through the inlet tube to produce liquid $IF_5$. This product probably includes other iodine fluorides as well and may include unreacted iodine.

The $C_2F_4$ starting compound was passed through a drying train (sulfuric acid followed by $P_2O_5$) before being led into the mixing vessel.

In particular experiments using tetrafluoroethylene ($C_2F_4$) as the starting compound, it was found that no reaction was detected below a reaction tube temperature of about 175° C., but at this approximate temperature and higher a significant conversion to $C_2F_5I$ was obtained. The material collected in the liquid-air trap was found to have a molecular weight range (determined from vapor density) of 100 to 245, a sharp break occurring evidently because of the wide difference in boiling points of the constituents.

Fractional distillation yielded a fraction having a molecular weight of 245 and a boiling point of plus 8° C. (at 725 mm.). This was analyzed and found to contain 39.5% fluorine and 51.8% iodine, as compared with the following values calculated from the formula of $C_2F_5I$, namely, 38.5% fluorine and 51.7% iodine. The formula weight for $C_2F_5I$ is 246, in close agreement with the molecular weight of the sample as determined from vapor density. The analysis was accomplished by fusing a dry, air-free sample with sodium metal, dissolving the resultant salts in water, filtering to remove carbon, and determining iodine and fluorine by Volhard and thorium nitrate titrations.

We have also discovered an alternative method of making saturated fluorocarbon mono-iodides, which is described and claimed in our companion application S. N. 111,762, filed of even date herewith, and since issued as Patent No. 2,554,219 on May 22, 1951. Briefly, this method comprises heating an anhydrous mixture of iodine and a silver salt of a saturated fluorocarbon monocarboxylic acid, in admixture with an inert solid or liquid diluent, to a temperature of about 100° C. or somewhat higher thereby causing evolution of the desired fluorocarbon mono-iodide reaction product, which can be readily recovered. Thus, for example, iodine and silver heptafluorobutyrate ($C_3F_7COOAg$) can be reacted to yield $C_3F_7I$, a liquid compound having a boiling point of about 39° C. Examples of solid inert diluents are dry, finely divided, sand, pumice, porcelain and glass. Examples of liquid inert diluents are saturated fluorocarbons, and non-reactive fluorocarbon compounds such as saturated fluorocarbon tertiary amines and saturated fluorocarbon ethers (as illustrated by trinonafluorobutylamine, $(C_4F_9)_3N$, having a boiling point of about 177° C., and by di-tridecafluorohexyl ether, $C_6F_{13}OC_6F_{13}$, having a boiling point of about 172° C.)

Having described various embodiments of our invention, for purposes of illustration rather than limitation, what we claim is as follows:

A method of making the fluorocarbon mono-iodide compound $C_2F_5I$ which comprises heating at a temperature of the order of 175 to 250° C. a vapor-phase mixture of iodine pentafluoride ($IF_5$) and tetrafluoroethylene ($C_2F_4$), and recovering the $C_2F_5I$ reaction product.

JOSEPH H. SIMONS.
THOMAS J. BRICE.

REFERENCES CITED

The following references are of record in the file of this patent:

UNITED STATES PATENTS

| Number | Name | Date |
|---|---|---|
| 2,110,369 | Leicester | Mar. 8, 1938 |
| 2,404,706 | Harmon | July 23, 1946 |
| 2,424,667 | Raasch | July 29, 1947 |
| 2,471,831 | McBee et al. | May 31, 1949 |
| 2,490,764 | Benning et al. | Dec. 13, 1949 |
| 2,493,008 | McBee et al. | Jan. 3, 1950 |
| 2,531,372 | Waterman | Nov. 21, 1950 |

OTHER REFERENCES

Ruff et al.: Zeit. Anorg. Chem., 201, pp. 245–51 (1931).

Banks: J. Chem. Soc., 1948, pp. 2188–90.

Simons et al.: J. A. C. S., 62, 3477–80 (1940).